United States Patent
Stahl

[15] 3,642,209
[45] Feb. 15, 1972

[54] THRUST NOZZLE FOR TURBOJET ENGINES

[72] Inventor: Ulli Stahl, Tutzing, Germany

[73] Assignee: Motoren- und Turbinen-Union Munchen GmbH

[22] Filed: Apr. 20, 1970

[21] Appl. No.: 30,099

[30] Foreign Application Priority Data

Apr. 22, 1969   Germany .................. P 19 203 40.8

[52] U.S. Cl. .................................. 239/265.19, 239/265.33
[51] Int. Cl. .................................................... B63h 11/10
[58] Field of Search ............... 239/265.19, 265.27, 265.33, 239/265.37, 265.41

[56] References Cited

UNITED STATES PATENTS

| | | | |
|---|---|---|---|
| 3,519,207 | 7/1970 | Clough | 239/265.19 X |
| 2,608,053 | 8/1952 | Davidson | 239/265.33 |
| 3,460,763 | 8/1969 | Kopp | 239/265.27 X |

*Primary Examiner*—Allen N. Knowles
*Assistant Examiner*—Thomas C. Culp, Jr.
*Attorney*—Craig, Antonelli & Hill

[57] ABSTRACT

A thrust nozzle for turbojet engines in which wedge-shaped flaps are adapted to be extended from and retracted into an engine fairing, the flaps are connected with each other by ball or roller tracks and are of different lengths while the flaps of different lengths are actuated at different speeds.

26 Claims, 10 Drawing Figures

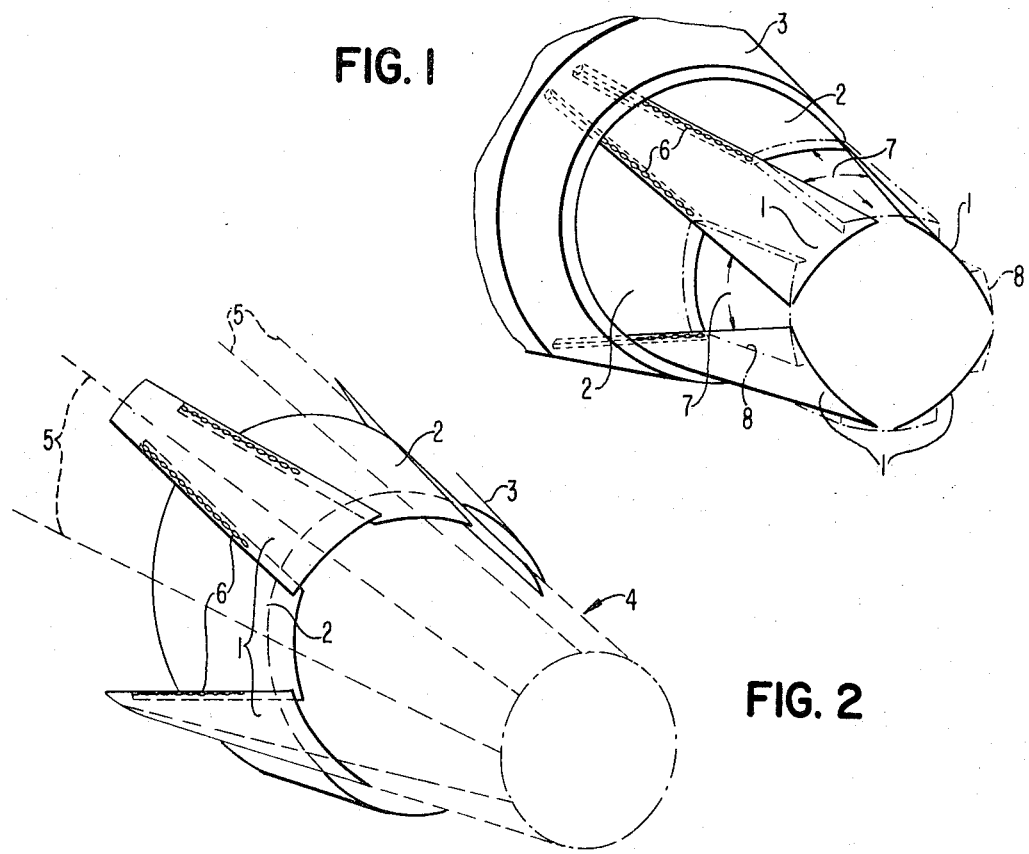
FIG. 1
FIG. 2
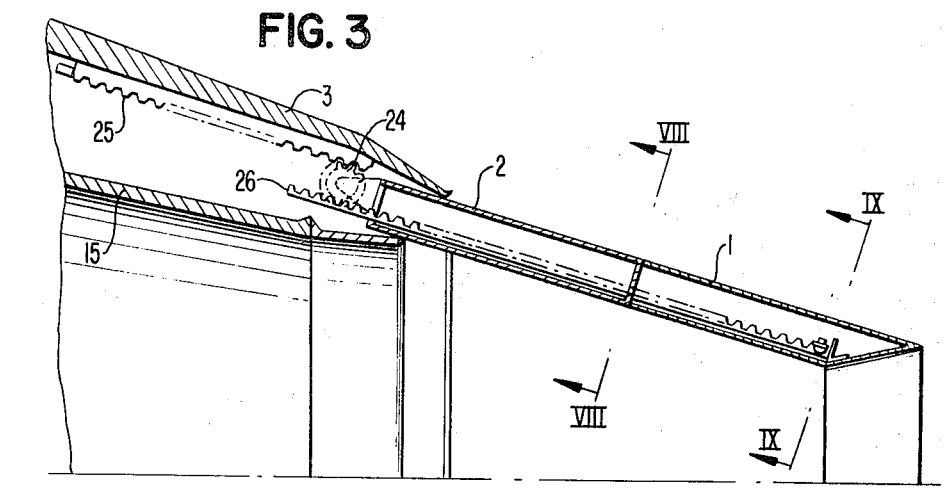
FIG. 3

THRUST NOZZLE FOR TURBOJET ENGINES

The present invention relates to thrust or final nozzles of turbojet engines provided with flap adjusting mechanisms to adjust the discharge cross section thereof.

Thrust nozzles for turbojet engines are already known which include adjusting flaps, placed adjacent one another in the nozzle circumference, which can be swiveled or pivoted about axes extending transversely to the nozzle center axis.

With these known thrust nozzles, all flaps are simultaneously pivoted into the gas stream in order to reduce the gas discharge cross section or outlet area and, to increase the gas discharge cross section or outlet area, the flaps are simultaneously pivoted outwards. In order to be able to reduce the gas outlet area with these known thrust nozzles, considerable actuating forces are required for pivoting the flaps into the gas stream. Due to these high actuating forces, the mechanisms for actuating the flaps of these known thrust nozzle constructions necessarily have to assume considerable dimensions and it is further necessary to provide powerful actuators or adjusting motors.

Another problem encountered with such an arrangement of the adjusting flaps, as mentioned above, is to maintain the flaps stabilized in each cross-sectional position of the thrust nozzle notwithstanding the high gas forces acting on the inner surfaces of the flaps.

Furthermore, a disadvantage of these known thrust nozzles is that as a result of the relatively far inwardly pivoted flaps, for example, during a cruise flight, a relatively large cross section of the stall zone with respect to the ambient air stream is produced which has as a consequence not inconsiderable aerodynamic losses.

A prior proposal seeks to eliminate these disadvantages inherent in the known thrust nozzles in that the flaps, provided for varying the discharge cross section of a thrust nozzle, are adapted to be retracted into or extended from a uniformly tapering engine fairing in a direction approximately normal to the gas forces acting on the inner surfaces thereof.

In this prior proposal, the extension of the flaps takes place by means of moveable extensions or brackets displaceably arranged inside the engine fairing and having a gear rotatably supported thereon which—on the one hand—with a movement of the extension or bracket engages with a serration fastened to the engine fairing and arranged approximately in parallel thereto, and located between the mounting positions of rollers, serving as guide for the extension or bracket whereby this gear—on the other hand—engages with a toothed rack, the downstream end of which is pivotally connected with two adjacent flaps.

The arrangement of extensions or brackets provided for a variable nozzle as described in the prior proposal, enables a desired, extremely rapid actuation of the flaps, however, on the other hand, it necessitates a considerable installation height which is undesirable, for instance, by reason of the required slender shape and strength of the fuselage aft-section of an aircraft.

The earlier aforementioned proposal for an actuating mechanism of a variable nozzle has the further disadvantage that the extensions or brackets, controlling the movement of the flaps are, in each case, located between two adjacent flaps, whereby the flaps are laterally supported at and guided by these extensions. Thus, when extended from the engine fairing, the flaps cannot support one another, i.e., they do not form a compact, conical, interconnected structure which would ensure that the bending moments acting on the flaps during the gas discharge of the jet pipe can be converted into circumferential tensile stresses.

The object of the present invention therefore is to eliminate the disadvantages of the aforementioned, prior art adjustable nozzles as well as those of the aforementioned prior proposal for an adjustable nozzle and to create a thrust nozzle whose flaps and actuating means for the flaps require a minimum installation space within the associated engine fairing, whereby the flaps are to form a stabilized and vibration-free interconnected structure in each end position of the thrust nozzle and a rapid actuation of the flaps is to be additionally made possible thereby.

Thus, the invention relates to a thrust nozzle for turbojet engines with wedge-shaped flaps for varying the discharge cross section, which can be extended from or retracted into an engine fairing having a uniform taper ratio.

In order to solve the underlying problems, the present invention primarily proposes to provide flaps which are interconnected by means of ball- or roller-tracks and which have different lengths and differing adjusting speeds.

For the realization of the inventive concept it may be assumed that the downstream portion of the engine fairing is constructed as a cone arranged coaxially to the extension of the engine longitudinal axis. In the fully extended end position for obtaining the minimum discharge cross section or gas outlet area, the thrust nozzle, according to the present invention, may thus form an approximately continuous extension of the cone formed by the engine fairing. Thus, all flaps of the thrust nozzle according to the present invention may move along the generatrices of this cone and the intersection lines of two adjacent flaps therefore are straight lines which lie in the connecting plane of the associated directions of movement of the flaps.

In order to be able to reduce the gas discharge cross section, for example, of a thrust nozzle according to the present invention, all flaps are extended simultaneously from the engine fairing, however, with different actuating speeds, so that, for example, one set of flaps is always extended farther and more rapidly from the engine fairing than another set of flaps.

As a further feature of the present invention, it would be advantageous to arrange one shorter flap each between two equally long flaps.

With this arrangement, the long flaps can be extended from or retracted into the engine fairing with double the adjusting speed of the shorter intermediate flaps; due to this speed differential, the long flaps may consequently be constructed twice as long as the shorter intermediate flaps, whence it follows that a long flap will always be extended from the engine fairing to twice the length of a shorter intermediate flap.

From these proposed different lengths and adjusting speeds of the flaps as well as from their continuously interconnected flap guide means results the fact that, e.g., with the long and short flaps fully extended out of the engine fairing, the total gas pressure along the thrust nozzle acting on these flaps can be absorbed as circumferential tensile stresses over the total length of the short intermediate flaps as well as over half of the extension length of the longer flaps.

Since the gas pressure decreases in the direction towards the nozzle discharge or exit, the individual flaps only have to take up approximately ⅓ of the total gas pressure along the nozzle as bending moment. Due to the selected speed differential and the associated different lengths of the intermediate flaps and of the long flaps, the cantilevered flap portions only have to absorb approximately 1/6 of the total bending load.

The short intermediate flaps arranged according to the present invention between two long flaps each, effect during all actuating phases the maintenance of the radial clearance between the long flaps as well as their controlled guided movement.

In order to obtain a conversion of the principal portion of the bending loads, caused by the gas pressure prevailing along the nozzle, into tensile stresses for all required end positions of the thrust nozzle, it is further proposed according to the present invention that balls or rollers retained in a cage, be arranged in the ball or roller tracks, driven synchronously at the speed difference of the intermediate flaps and of the long flaps, and that a gear is rotatably supported at each cage, which engages, on the one hand, with a toothed rack secured on the side of an intermediate flap and, on the other hand, with another toothed rack arranged at the side of an adjacent long flap.

Thus, according to this proposal, the balls or rollers are positively synchronized in their respective guides as a function of the different actuating speeds of the short and long flaps.

The balls and rollers in their associated guides, arranged at the flaps, can move in such a manner that, with the flaps fully extended out of the engine fairing (smallest gas discharge cross section of the thrust nozzle), one set of balls or rollers rests with one end, e.g., with its first ball, against the downstream end of an intermediate flap.

With the nozzle fully opened, i.e., when all flaps are retracted into the engine fairing, it should be possible to slide all balls or rollers closed and simultaneously out of the short intermediate flaps, in accordance with the selected different lengths and speed differentials of the flaps, for which purpose it is further proposed according to the present invention that those portions of the ball or roller tracks associated with the intermediate flaps are extended in an upstream direction.

According to a further feature of the present invention, mutually separate or common actuating devices for the adjusting movement of the short intermediate flaps as well as the long flaps can be provided.

According to the present invention, a respective short intermediate flap or long flap can be equipped with actuating devices which effect the adjusting movement of two adjacent flaps. This means that, for example, all intermediate flaps may cause a simultaneous but faster movement of the long flaps, as compared to their own movement.

In this case, the intermediate flaps may engage upstream with guide means thereof into sliding rails attached to the engine fairing; it is advantageous in that connection that the intermediate flaps as an integral component in the actuating system effecting the simultaneous movement of the long flaps, need not be longer than the long flaps, notwithstanding the upstream guide means, so that a small installation depth for the intermediate flaps within the engine fairing can be achieved.

According to a further feature of the invention, each intermediate flap may be connected with at least one toothed rack arranged parallel to the center axis thereof, whereby the toothed rack is positively or force-lockingly connected by way of gears and transmissions with an actuator or adjusting motor provided for the adjustment of all intermediate flaps.

In order to be able to actuate all long flaps, for example, as proposed, by the effect of the intermediate flap movement, the invention proposes at least one gear arranged upstream at each intermediate flap, which engages, on the one hand, with an upper toothed rack attached to the inner wall of the engine fairing, which is slidably guided and retracted inside the intermediate flap and is pivotally connected downstream to two long flaps bordering an intermediate flap.

In order to obtain an effective sealing of the spaces between the ends of the long flaps protruding beyond the short flaps so that an uninterrupted nozzle wall, closed on all sides, is formed in every extended end position of the flaps when extended out of the engine fairing, the invention proposes to provide seal flaps which are actuated by the toothed racks and embrace the long flaps and which can be extended from or retracted into the intermediate flaps.

These and other objects, features and advantages of the present invention will become more obvious from the following description, when taken in connection with the accompanying drawing which shows, for purposes of illustration only, one embodiment in accordance with the present invention, and wherein:

FIG. 1 is a perspective view of the thrust nozzle according to the invention, shown in a first end position;

FIG. 2 is a perspective view of the thrust nozzle according to the invention, shown in a second end position.

FIG. 3 is a partial, somewhat schematic cross-sectional view of the upper half of a thrust nozzle according to the invention with the flaps extended out of the engine fairing in order to obtain the smallest gas discharge cross section;

FIGS. 1 and 2 illustrate two different end positions of the thrust nozzle according to the invention in a schematic presentation.

Figure 4:
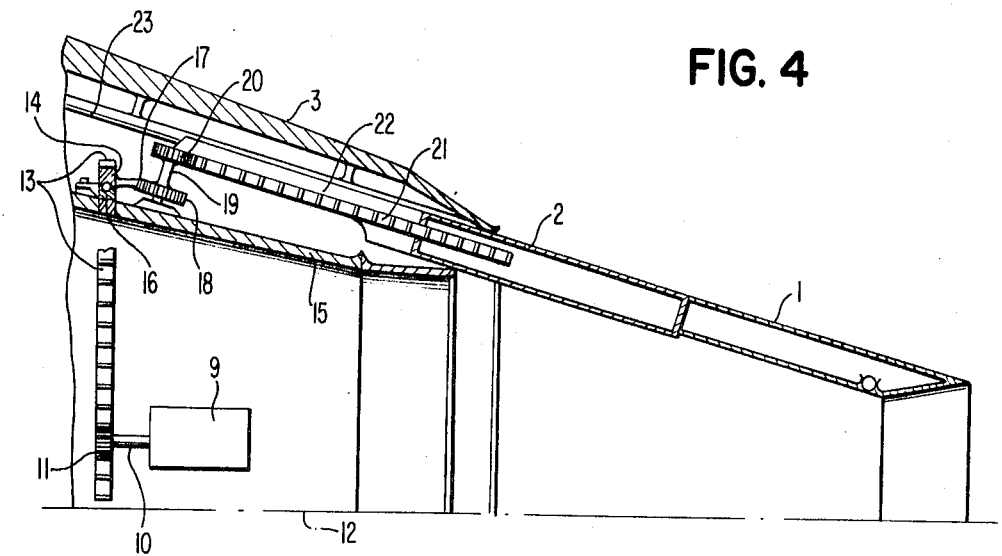
FIG. 4 is a partial, somewhat schematic cross-sectional view of the upper half of a thrust nozzle according to the invention in the end position of the flaps according to FIG. 3.

In order to obtain the smallest possible gas discharge area as shown in FIG. 1, all long flaps 1 as well as all short intermediate flaps 2 are completely extended out of a uniformly tapering end of an engine fairing 3. The engine fairing 3 is part of a jet engine, not further shown in the drawing, and may be formed, for example, by the fuselage or nacelle aft-section of an aircraft which is also not shown in the drawing.

FIG. 2 illustrates a second end position of the thrust nozzle according to the invention, with maximum nozzle discharge area, in which the long flaps 1 as well as the short intermediate flaps 2 are retracted into engine fairing 3.

With the long flaps 1 and the short intermediate flaps 2, according to FIG. 1, completely extended out of the engine fairing 3, they approximately enclose a cone 4, schematically shown in FIG. 2. Reference numeral 5 designates the generatrices of this cone 4, along which the long flaps 1 and the intermediate flaps 2 are always moved in all adjusting movements for changing the gas discharge area or cross section.

As will be explained more fully hereinafter, the long flaps 1 and intermediate flaps 2 are connected by way of intermeshing ball tracks 6. These ball tracks 6 extend beyond the upstream ends of the intermediate flaps 2.

As can be further seen from FIGS. 1 and 2, the long flaps 1 have approximately twice the length of the intermediate flaps 2. Corresponding to this length differential, the long flaps 1 are moved with approximately twice the speed of the intermediate flaps 2 along the generatrices 5 of the cone 4 in order to change the gas discharge cross section. If, for example, all flaps are extended out of the engine fairing 3 to assume any desired end position, then the intermediate flaps 2—always moving only half as fast as the long flaps 1—always stay or remain behind by half of the extended length of the long flaps 1. The same applies to the retraction phase of the long flaps 1 and of the intermediate flaps 2 into engine fairing 3. The intermediate flaps 2 and the long flaps 1 are designed wedge-shaped and slightly curved, as can be seen from FIGS. 1 and 2. As a result of the actuating speed of intermediate flaps 2, which is always one-half that of the long flaps 1, all flaps move relative to one another approximately in the shape of tapering wedges forming the elements of a cone 4 to be selected (FIG. 2), the smallest and largest diameter of which depend approximately upon the required smallest and largest gas discharge area.

The long flaps 1 protrude beyond the intermediate flaps 2 whenever the flaps 1 are extended out of the engine fairing 3. As can be seen by reference to the fully extended end position of all flaps out of the engine fairing 3 (FIG. 1), wedge-shaped spaces 7 are formed between two adjacent half side flanks of two long flaps 1 protruding beyond the intermediate flaps 2. These spaces 7 can, for example, be closed on the inside and outside by means of short seal flaps 8, 53 (FIG. 9) which are connected downstream to the long flaps 1, as will be described more fully hereinafter, so that the seal flaps are moved along by the long flaps 1 in all adjusting phases and are thus retractable into or extendable from engine fairing 3.

Figure 5:
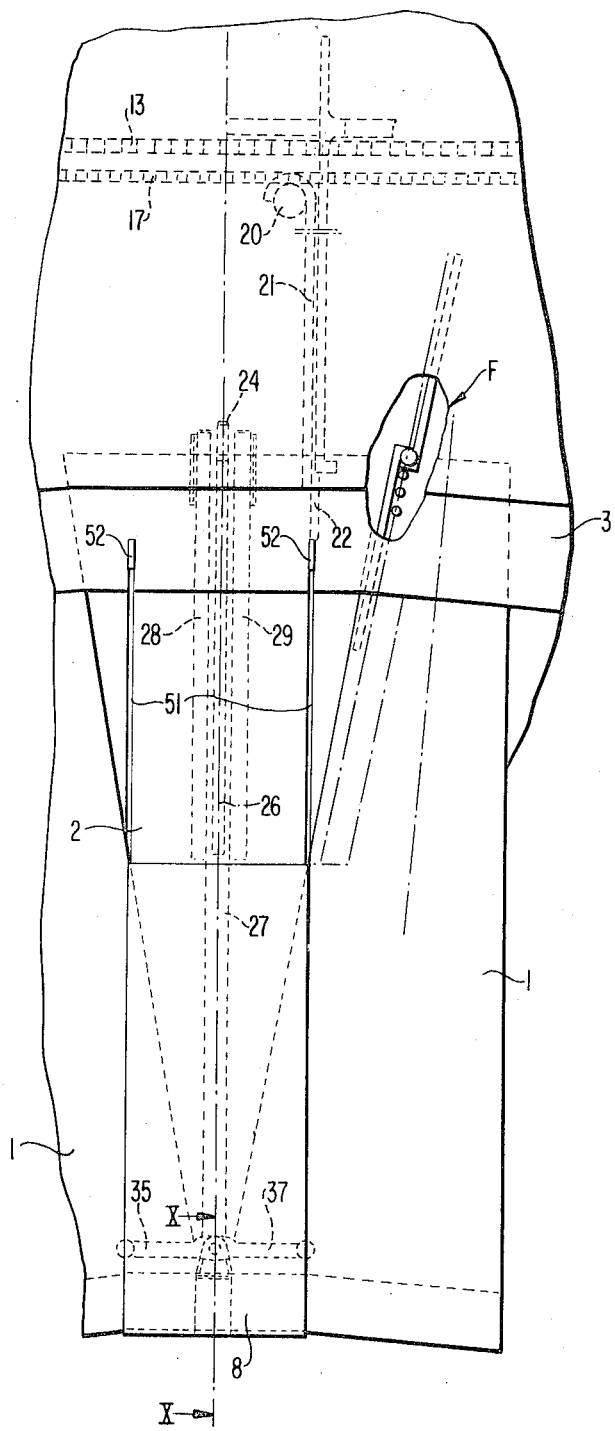
FIG. 5 is a partial plan view of a thrust nozzle according to the invention, including the associated devices effecting the flap movement.

FIGS. 3, 4 and 5 show further details as to the adjusting devices of the long flaps 1 and of the intermediate flaps 2, and more particularly an actuator or adjusting motor 9 is provided inside the engine fairing 3, which may be an air motor, a hydraulic actuator or an electric motor, that drives a spur or ring gear 13, arranged coaxially to the nozzle longitudinal center-axis 12, by way of a reduction gear, associated with the adjusting motor and not shown in the drawing, and by way of a gear 11 attached to a shaft 10. This gear 13 is constructed at the same time as outer bearing race 14 which runs as a so-called angular contact ball bearing on a fixed inner ring 16 arranged on jet pipe 15. Another ring gear 17, arranged coaxially to the nozzle longitudinal centerline, is attached at the bearing outer race 14 and engages with a gear 18. The gear 18 is connected with a further gear 20 by way of a shaft 19, whereby the gear 20 transmits the rotational movement initiated by the adjusting motor 9 to a toothed rack 21. The toothed rack 21 is secured, laterally, to the inside of an intermediate flap 2, i.e., primarily to sliding rails or tracks 22 which serve as guides for an intermediate flap 2 within the engine fairing 3, whereby the sliding rails or tracks 22 are able to slide along tracks 23 within the engine fairing 3. In this manner, all remaining intermediate flaps 2, as shown in FIGS. 1 and 2, are actuated by means of the elements identified by reference numerals 18 through 23 in FIGS. 4 and 5, which are equally spaced, corresponding to the number of intermediate flaps, within the engine fairing 3.

In order to be able to adjust the long flaps 1 twice as fast as the intermediate flaps 2, according to FIG. 3, a gear 24 (see also FIG. 5) is rotatably supported upstream at each intermediate flap 2, which engages, on the one hand, with its upper side (as seen in FIG. 3) with a serration 25 secured to the engine fairing 3 and on its bottom side (as seen in FIG. 3) with a toothed rack 26. Each toothed rack 26 is displaceably guided inside an intermediate flap 2, approximately parallel to the generatrix 5 of the cone 4 (FIG. 2); for this purpose, according to FIG. 8, the guide tracks 28, 29 as well as bolts 30, 31, which are secured at the intermediate flaps 2 on the same level with gear 24 (FIG. 3), together with needle bearings 30', 31' are provided.

As can be further seen from FIGS. 3 and 5, each toothed rack 26 includes an extension 27, protruding from the downstream end of an intermediate flap 2, which at its end is connected with two bordering long flaps 1. As can be seen from FIG. 9, each extension 27 is provided for this purpose at the end with a double-armed lever 34 secured thereat by a bolt 32 and nut 33. Each end of the double-armed lever 34 carries a roller 36, rotatable about a bolt 35; each of the rollers 36 can roll off in an associated sliding rail 37 of a long flap 1, so that forces can be transmitted along the flap axis and the relative movements, transverse to the flap axis, can be absorbed. Due to the described arrangement, the intermediate flaps 2 thus transmit the driving energy produced of the adjusting motor 9 to the long flaps 1 which can be moved twice as fast as the intermediate flaps 2.

Figure 8:
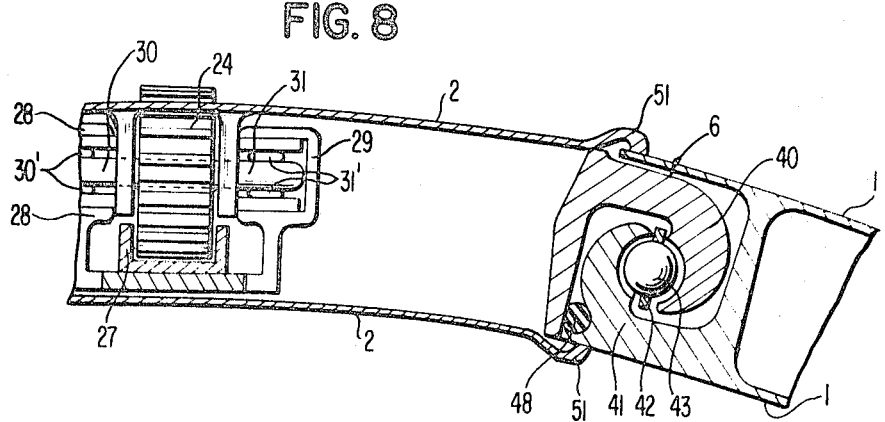
FIG. 8 is a partial cross-sectional view taken along line VIII—VIII in FIG. 3.

FIG. 8 presents further details of the ball tracks 6, shown only schematically in FIGS. 1 and 2, with intermeshing ball guides 40 and 41 of the flaps 1 and 2, between which balls 43 retained in a cage 42 (FIG. 6), are held so as to be able to slide along straight lines with all adjusting movements of the thrust nozzle.

Figure 6:
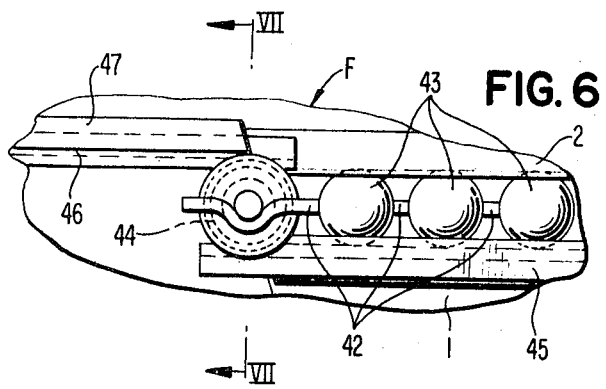
FIG. 6 shows a detailed and enlarged part of FIG. 5, illustrating a set of balls formed by two engaging ball guides, which are actuated by positive synchronization.
Figure 7:
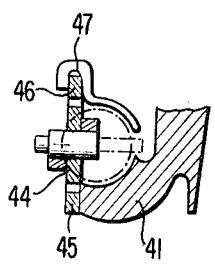
FIG. 7 is a cross-sectional view taken along line VII—VII in FIG. 6.

FIG. 6 shows an enlarged detail F of FIG. 5, illustrating the coupling of a set of rollers 43, retained in a cage 42, positively synchronized as a function of the speed differential between a long flap 1 and an intermediate flap 2.

In accordance with detail F, as can be seen from FIGS. 5 and 6, the ball set 43 is withdrawn into intermediate flap 2 for an end position of the long flaps 1 and the intermediate flaps 2, in which they are extended out of the engine fairing 3 as far as possible, while, for the other end position, they are extended in an upstream direction out of the intermediate flaps 2 by means of extensions of the tracks 6 (FIG. 1).

In order to displace the cage 42 of a ball set 43, a gear 44 is rotatably attached to the front of the cage which, on the one hand, engages with a toothed rack 45, connected by way of ball guide means 41 with a long flap 1, and which engages, on the other hand, with a toothed rack 46 which, in this case (FIG. 6), is extended from a ball guide means 40 (FIG. 8) associated with an intermediate flap 2 and is supported downstream at an intermediate flap 2 by means of an extended track 47.

FIG. 8 further illustrates an elastic seal 48 between a long flap 1 and an intermediate flap 2.

Figure 9:
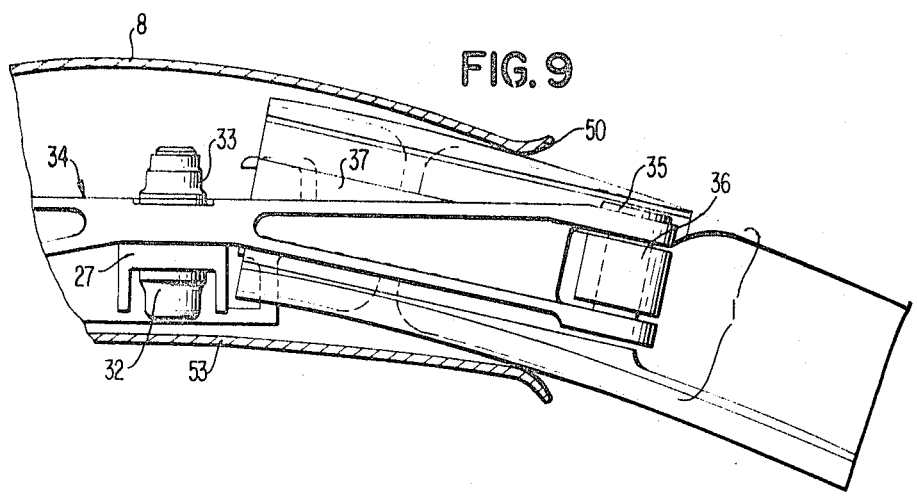
FIG. 9 is a partial cross-sectional view taken along line IX—IX in FIG. 3.

Furthermore, one of two guide radii 50 arranged laterally at the outer seal flap 8, can be seen from FIG. 9; the seal flaps 8, for example, to reach an end position of the thrust nozzle as in FIG. 2, engage by means of guide radii 50 with grooved profiles 51, provided in every intermediate flap 2 and shown in FIGS. 5 and 8, so that the seal flaps 8 are retracted into the engine fairing 3 together with the intermediate flaps 2. Recesses in the engine fairing 3, to enable the passing of the grooved profiles 51, are indicated by 52 in FIG. 5.

Figure 10:
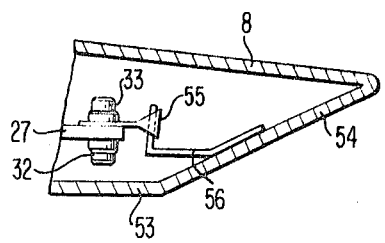
FIG. 10 is a cross-sectional view taken along line X—X in FIG. 5.

FIGS. 9 and 10 illustrate that the outer seal flaps 8 are connected to their inner wall portions 53.

As can also be seen from FIG. 10, the outer seal flaps 8 and their associated inner wall portions 53 are connected downstream, at a distance corresponding to the end of the long flaps 1 (FIG. 3), by means of a sheet metal part 54, converging rearwardly at an acute angle. The seal flaps 8, 53 are actuated by the extension 27 of the toothed rack 26 by means of a strap 55 secured by the bolt 32, strap 55 engaging with another strap 56 mounted at the sheet metal part 54 in such a way, as to enable compensation for any radial offset.

While I have shown and described only one embodiment in accordance with the present invention, it is understood that the same is susceptible of numerous changes and modifications as known to those skilled in the art, and I therefore do not wish to be limited to the details shown and described herein but intend to cover all such changes and modifications as are encompassed by the scope of the appended claims.

I claim:

1. A thrust nozzle for turbojet engines having approximately wedge-shaped flap means for changing the gas discharge area, in which the wedge-shaped flap means are adapted to be extended from or retracted into an engine fairing with substantially uniform taper, characterized in that the flap means are connected by mutually engaging antifriction track means and have different lengths, and means providing different adjusting speeds for the flap means of different lengths.

2. A thrust nozzle according to claim 1, characterized in that said antifriction track means are ball tracks.

3. A thrust nozzle according to claim 1, characterized in that said antifriction track means are roller tracks.

4. A thrust nozzle according to claim 1, characterized in that said flap means consist of relatively short and relatively long flap means.

5. A thrust nozzle according to claim 1, characterized in that antifriction members retained by a cage are arranged in the antifriction track means and are displaced synchronously with the speed differential of the flap means, and in that a gear is rotatably supported at each cage, engaging with a toothed rack slidably guided at the side of one flap means and also engaging with a toothed rack arranged at the side of an adjacent other flap means.

6. A thrust nozzle according to claim 4, characterized in that those portions of the antifriction track means associated with short flap means are extended in an upstream direction.

7. A thrust nozzle according to claim 4, characterized in that separate actuating means are provided for the long and the short flap means.

8. A thrust nozzle according to claim 4, characterized in that common actuating means are provided for the long and the short flap means.

9. A thrust nozzle according to claim 4, characterized in that actuating means for adjusting two adjacent flaps are provided on each flap means of only one type of flap means consisting of long and short flap means.

10. A thrust nozzle according to claim 4, characterized in that each one of the two flap means consisting of long and short flap means engage upstream with sliding rails in tracks attached to engine fairing.

11. A thrust nozzle according to claim 10, characterized in that each short flap means is connected with at least one toothed rack arranged parallel to the center axis thereof, said toothed rack being force-lockingly connected with an adjusting motor provided for actuating all short flap means.

12. A thrust nozzle according to claim 10, characterized in that at least one gear is arranged upstream on each short flap means, the last-mentioned gear engaging with an outside toothed rack secured to the inner wall of the engine fairing and also with an inside toothed rack slidably guided and supported within the short flap means, said inside toothed rack being pivotally connected downstream with two long flap means adjoining a short flap means.

13. A thrust nozzle according to claim 12, characterized in that seal flap means embracing the long flap means and actuated by said last-mentioned toothed racks are provided which can be retracted into or extended from the intermediate flap means.

14. A thrust nozzle according to claim 4, characterized in that each short flap means is connected with at least one toothed rack arranged parallel to the center axis thereof, said toothed rack being force-lockingly connected with an adjusting motor provided for actuating all short flap means.

15. A thrust nozzle according to claim 4, characterized in that at least one gear is arranged upstream on each short flap means, the last-mentioned gear engaging with an outside toothed rack secured to the inner wall of the engine fairing and also with an inside toothed rack slidably guided and supported within the short flap means, said inside toothed rack being pivotally connected downstream with two long flap means adjoining a short flap means.

16. A thrust nozzle according to claim 15, characterized in that seal flap means embracing the long flap means and actuated by said last-mentioned toothed racks are provided which can be retracted into or extended from the intermediate flap means.

17. A thrust nozzle for turbojet engines having approximately wedge-shaped flap means for changing the gas discharge area, in which the wedge-shaped flap means are adapted to be extended from or retracted into an engine fairing with substantially uniform taper, characterized in that the flap means are connected by mutually engaging antifriction track means have different lengths and different adjusting speeds, and in that a short intermediate flap means is arranged between two equally long flap means.

18. A thrust nozzle according to claim 17, characterized in that antifriction members retained by a cage are arranged in the antifriction track means and are displaced synchronously with the speed differential of the short flap means and the other flap means, and in that a gear is rotatably supported at each cage, engaging with a toothed rack slidably guided at the side of one intermediate flap means and also engaging with a toothed rack arranged at the side of an adjacent other long flap means.

19. A thrust nozzle according to claim 18, characterized in that those portions of the antifriction track means associated with short flap means are extended in an upstream direction.

20. A thrust nozzle according to claim 19, characterized in that separate actuating means are provided for the long and the short flap means.

21. A thrust nozzle according to claim 19, characterized in that common actuating means are provided for the long and the short flap means.

22. A thrust nozzle according to claim 19, characterized in that actuating means for adjusting two adjacent flaps are provided on each flap means of only one type of flap means consisting of long and short flap means.

23. A thrust nozzle according to claim 22, characterized in that each one of the two flap means consisting of long and short flap means engage upstream with sliding rails in tracks attached to engine fairing.

24. A thrust nozzle according to claim 23, characterized in that each short flap means is connected with at least one toothed rack arranged parallel to the center axis thereof, said toothed rack being force-lockingly connected with an adjusting motor provided for actuating all short flap means.

25. A thrust nozzle according to claim 24, characterized in that at least one gear is arranged upstream on each short flap means, the last-mentioned gear engaging with an outside toothed rack secured to the inner wall of the engine fairing and also with an inside toothed rack slidably guided and supported within the short flap means, said inside toothed rack being pivotally connected downstream with two long flap means adjoining a short flap means.

26. A thrust nozzle according to claim 25, characterized in that seal flap means embracing the long flap means and actuated by said last-mentioned toothed racks are provided which can be retracted into or extended from the intermediate flap means.

* * * * *